(12) United States Patent
Chen et al.

(10) Patent No.: US 8,352,215 B2
(45) Date of Patent: Jan. 8, 2013

(54) COMPUTER-IMPLEMENTED DISTRIBUTED ITERATIVELY REWEIGHTED LEAST SQUARES SYSTEM AND METHOD

(75) Inventors: Lin (Colin) Chen, Rockville, MD (US);
Steve Krueger, Raleigh, NC (US);
Christopher D. Bailey, Cary, NC (US)

(73) Assignee: SAS Institute Inc., Cary, NC (US)

( * ) Notice: Subject to any disclaimer, the term of this patent is extended or adjusted under 35 U.S.C. 154(b) by 399 days.

(21) Appl. No.: 12/604,631

(22) Filed: Oct. 23, 2009

(65) Prior Publication Data
US 2011/0098972 A1 Apr. 28, 2011

(51) Int. Cl.
*G06F 17/18* (2006.01)
*G06F 19/00* (2011.01)

(52) U.S. Cl. ...................................... 702/179

(58) Field of Classification Search .................. None
See application file for complete search history.

(56) References Cited

U.S. PATENT DOCUMENTS

| | | | | |
|---|---|---|---|---|
| 4,947,363 | A * | 8/1990 | Williams | 708/322 |
| 5,001,661 | A * | 3/1991 | Corleto et al. | 708/322 |
| 7,490,120 | B2 | 2/2009 | Gustavson et al. | |
| 2005/0193050 | A1 | 9/2005 | Sazegari | |
| 2006/0041403 | A1* | 2/2006 | Jaber | 702/189 |
| 2006/0149503 | A1 | 7/2006 | Minor | |
| 2008/0263118 | A1 | 10/2008 | Montvelishsky | |

OTHER PUBLICATIONS

SAS/STAT 9.2 User's Guide, Chapter 74, pp. 5642-5711 [Mar. 2008].
Adams, N.M. et al., "A review of parallel processing for statistical computation", Statistics and Computing, vol. 6, pp. 37-49 [1996].
Coleman, David et al., "A System of Subroutines for Iteratively Reweighted Least Squares Computations", ACM Transactions on Mathematical Software, vol. 6, No. 3, pp. 327-336 [Sep. 1980].
El-Sayed, Hoda et al., "Parallel Maximum-Likelihood Inversion for Estimating Wavenumber-Ordered Spectra in Emission Spectroscopy", IEEE International Parallel and Distributed Processing Symposium, 6 pp. [Apr. 2000].
Fessler, Jeffrey A., "Penalized Weighted Least-Squares Image Reconstruction for Positron Emission Tomography", IEEE Trans. Medical Imaging, vol. 13, No. 2, pp. 290-300 [Jun. 1994].
George, William, "Dynamic Load-Balancing for Data-Parallel MPI Programs", Message Passing Interface Developer's and User's Conference (MPIDC '99), 7 pp. [1999].

(Continued)

*Primary Examiner* — Michael Nghiem
(74) *Attorney, Agent, or Firm* — Kilpatrick Townsend & Stockton LLP

(57) ABSTRACT

Systems and methods are provided for performing an estimation using an iteratively reweighted least squares technique on a scenario defined by a design matrix, a response variable vector, and a parameter to be estimated. A system and method can be configured to include a root data processor, where a least squares estimate is calculated by the root data processor during each of a plurality of processing iterations. A plurality of node data processors can also be configured to: update values of a weight matrix according to a current state of the least squares estimate, determine a first intermediate value based on the design matrix and the weight matrix, determine a second intermediate value based on the design and weight matrices and the response variable vector. The root data processor calculates an updated least squares estimate based on the intermediate values.

20 Claims, 16 Drawing Sheets

OTHER PUBLICATIONS

Hawkins, Douglas M. et al., "Distributing a Computationally Intensive Estimator: The Case of Exact LMS Regression", Computational Statistics, Vo. 9, pp. 83-95 [1994].

Heiberger, Richard M. et al., "Design of an S Function for Robust Regression Using Iteratively Reweighted Least Squares", Journal of Computational and Graphical Statistics, vol. 1, No. 3, pp. 181-196 [1992].

Jaeckel, Louis A., "Estimating Regression Coefficients by Minimizing the Dispersion of the Residuals", The Annals of Mathematical Statistics, No. 43, No. 5, pp. 1449-1458 [1972].

Kapenga, John A. et al., "The Vectorization of Algorithms for R-Estimates in Linear Models", Proceedings of the 19$^{th}$ Symposium on the Interface: Computer Science and Statistics, pp. 502-506 [1988].

Kaufman, L. et al., "Using a Parallel Computer System for Statistical Resampling Methods", Computational Statistics Quarterly 2, pp. 129-141 [1988].

Li, Yuying, "Piecewise Differentiable Minimization for Ill-Posed Inverse Problems", Cornell Theory Center Technical Reports, 96-252, 17 pp. [Aug. 1996].

McKean, Joseph W. et al., "A robust analysis of the general linear model based on one step R-estimates", Biometrika, vol. 65, No. 3, pp. 571-579 [1978].

Rousseeuw, Peter J., "Least Median of Squares Regression", Journal of the American Statistical Association, vol. 79, No. 388 pp. 871-880 [Dec. 1984].

Rousseeuw, Peter J. et al., "Robust regression with a distributed intercept using least median of squares", Computational Statistics & Data Analysis, vol. 17, pp. 65-75 [1994].

Xu, Chong-wei et al., "Parallel algorithms for least median of squares regression", Computational Statistics & Data Analysis, vol. 16, pp. 349-362 [1993].

\* cited by examiner

GIVEN AN 8x4 X MATRIX LIKE:

$$702 \rightarrow X = \begin{matrix} x11 & x12 & x13 & x14 \\ x21 & x22 & x23 & x24 \\ x31 & x32 & x33 & x34 \\ x41 & x42 & x43 & x44 \\ x51 & x52 & x53 & x54 \\ x61 & x62 & x63 & x64 \\ x71 & x72 & x73 & x74 \\ x81 & x82 & x83 & x84 \end{matrix} = \begin{matrix} 11 & 12 & 13 & 14 \\ 21 & 22 & 23 & 24 \\ 31 & 32 & 33 & 34 \\ 41 & 42 & 43 & 44 \\ 51 & 52 & 53 & 54 \\ 61 & 62 & 63 & 64 \\ 71 & 72 & 73 & 74 \\ 81 & 82 & 83 & 84 \end{matrix}$$

AND A GIVEN 1x8 MATRIX LIKE:

$$704 \rightarrow Y = \begin{matrix} y^1 \\ y^2 \\ y^3 \\ y^4 \\ y^5 \\ y^6 \\ y^7 \\ y^8 \end{matrix} = \begin{matrix} 1 \\ 2 \\ 3 \\ 4 \\ 5 \\ 6 \\ 7 \\ 8 \end{matrix}$$

AND A GIVEN 4X4 MATRIX INITIALIZED LIKE:

$$706 \rightarrow W = \begin{matrix} w11 & w12 & w13 & w14 \\ w21 & w22 & w23 & w24 \\ w31 & w32 & w33 & w34 \\ w41 & w42 & w43 & w44 \end{matrix} \quad \begin{matrix} 1.0 & 0.0 & 0.0 & 0.0 \\ 0.0 & 1.0 & 0.0 & 0.0 \\ 0.0 & 0.0 & 1.0 & 0.0 \\ 0.0 & 0.0 & 0.0 & 1.0 \end{matrix}$$

Fig. 7

```
   NODE 0          |   NODE 1          |   NODE 2          |   NODE 3
X             Y    | X             Y   | X             Y   | X             Y
11 12 13 14   1    | 31 32 33 34  3    | 51 52 53 54  5    | 71 72 73 74  7
21 22 23 24   2    | 41 42 43 44  4    | 61 62 63 64  6    | 81 82 83 84  8
```

Fig. 8

```
                                    MATCH TO FIG.9A

X'X =   121+441    132+462    143+483    154+504
        132+462    144+484    156+506    168+528
        143+483    156+506    169+529    182+552
        154+504    168+528    182+552    196+576

X'X =   562   594   626   658
        594   628   662   696
        626   662   698   734
        658   696   734   772

SIMILARLY FOR NODE 1:
X'X =  2642  2714  2786  2858
       2714  2788  2862  2936
       2786  2862  2938  3014
       2858  2936  3014  3092

SIMILARLY FOR NODE 2:
X'X =  6322  6434  6546  6658
       6434  6548  6662  6776
       6546  6662  6778  6894
       6658  6776  6894  7012

AND FINALLY, FOR NODE 3:
X'X = 11602 11754 11906 12058
      11754 11908 12062 12216
      11906 12062 12218 12374
      12058 12216 12374 12532
```

906

1002 — FIRST, NODE 1'S X'X MATRIX IS ADDED TO NODE 0'S X'X MATRIX:

$$X'X = \begin{matrix} 562 & 594 & 626 & 658 \\ 594 & 628 & 662 & 696 \\ 626 & 662 & 698 & 734 \\ 658 & 696 & 734 & 772 \end{matrix} + \begin{matrix} 2642 & 2714 & 2786 & 2858 \\ 2714 & 2788 & 2862 & 2936 \\ 2786 & 2862 & 2938 & 3014 \\ 2858 & 2936 & 3014 & 3092 \end{matrix}$$

$$X'X = \begin{matrix} 3204 & 3308 & 3412 & 3516 \\ 3308 & 3416 & 3524 & 3632 \\ 3412 & 3524 & 3636 & 3748 \\ 3516 & 3632 & 3748 & 3864 \end{matrix}$$

1004

NODE 3'S X'X MATRIX IS ADDED TO NODE 2'S X'X MATRIX:

$$X'X = \begin{matrix} 6322 & 6434 & 6546 & 6658 \\ 6434 & 6548 & 6662 & 6776 \\ 6546 & 6662 & 6778 & 6894 \\ 6658 & 6776 & 6894 & 7012 \end{matrix} + \begin{matrix} 11602 & 11754 & 11906 & 12058 \\ 11754 & 11908 & 12062 & 12216 \\ 11906 & 12062 & 12218 & 12374 \\ 12058 & 12216 & 12374 & 12532 \end{matrix}$$

$$X'X = \begin{matrix} 17924 & 18188 & 18452 & 18716 \\ 18188 & 18456 & 18724 & 18992 \\ 18452 & 18724 & 18996 & 19268 \\ 18716 & 18992 & 19268 & 19544 \end{matrix}$$

1006

THEN FINALLY, NODE 2'S X'X PARTIAL AGGREGATION IS ADDED TO NODE 0'S X'X PARTIAL AGGREGATION:

$$X'X = \begin{matrix} 3204 & 3308 & 3412 & 3516 \\ 3308 & 3416 & 3524 & 3632 \\ 3412 & 3524 & 3636 & 3748 \\ 3516 & 3632 & 3748 & 3864 \end{matrix} + \begin{matrix} 17924 & 18188 & 18452 & 18716 \\ 18188 & 18456 & 18724 & 18992 \\ 18452 & 18724 & 18996 & 19268 \\ 18716 & 18992 & 19268 & 19544 \end{matrix}$$

$$X'X = \begin{matrix} 21128 & 21496 & 21864 & 22232 \\ 21496 & 21872 & 22248 & 22624 \\ 21864 & 22248 & 22632 & 23016 \\ 22232 & 22624 & 23016 & 23408 \end{matrix}$$

1008

AND THEN IN TRIANGULAR FORM IT BECOMES:

$$X'X = \begin{matrix} 21128 & & & \\ 21496 & 21872 & & \\ 21864 & 22248 & 22632 & \\ 22232 & 22624 & 23016 & 23408 \end{matrix}$$

1102
NODE 0 INPUTS (FIRST TIME W MATRIX INITIALIZED TO 1):

$$X = \begin{matrix} x11 & x12 & x13 & x14 \\ x21 & x22 & x23 & x24 \end{matrix} = \begin{matrix} 11 & 12 & 13 & 14 \\ 21 & 22 & 23 & 24 \end{matrix}$$

$$Y = \begin{matrix} y1 \\ y2 \end{matrix} = \begin{matrix} 1 \\ 2 \end{matrix}$$

1104

THEREFORE, $X' = \begin{matrix} x11 & x21 \\ x12 & x22 \\ x13 & x23 \\ x14 & x24 \end{matrix} = \begin{matrix} 11 & 21 \\ 12 & 22 \\ 13 & 23 \\ 14 & 24 \end{matrix}$

NODE 0 CALCULATING X'Y:

1106
$$X'Y = \begin{matrix} x11*y1 + x21*y2 \\ x12*y1 + x22*y2 \\ x13*y1 + x23*y2 \\ x14*y1 + x24*y2 \end{matrix} = \begin{matrix} 11*1+21*2 \\ 12*1+22*2 \\ 13*1+23*2 \\ 14*1+24*2 \end{matrix} = \begin{matrix} 53 \\ 56 \\ 59 \\ 62 \end{matrix}$$

SIMILARLY FOR NODE 1:

$$X'Y = \begin{matrix} 257 \\ 264 \\ 271 \\ 278 \end{matrix}$$

SIMILARLY FOR NODE 2:

$$X'Y = \begin{matrix} 621 \\ 632 \\ 643 \\ 654 \end{matrix}$$

AND FINALLY, FOR NODE 3:

$$X'Y = \begin{matrix} 1145 \\ 1160 \\ 1175 \\ 1190 \end{matrix}$$

FIRST, NODE 1'S X'Y MATRIX IS ADDED TO NODE 0'S X'Y MATRIX:

$$X'Y = \begin{matrix} 53 \\ 56 \\ 59 \\ 62 \end{matrix} + \begin{matrix} 257 \\ 264 \\ 271 \\ 278 \end{matrix} = \begin{matrix} 310 \\ 320 \\ 330 \\ 340 \end{matrix}$$

1204

NODE 3'S X'Y MATRIX IS ADDED TO NODE 2'S X'Y MATRIX:

$$X'Y = \begin{matrix} 621 \\ 632 \\ 643 \\ 654 \end{matrix} + \begin{matrix} 1145 \\ 1160 \\ 1175 \\ 1190 \end{matrix} = \begin{matrix} 1766 \\ 1792 \\ 1818 \\ 1844 \end{matrix}$$

1206

THEN FINALLY, NODE 2'S X'Y PARTIAL AGGREGATION IS ADDED TO NODE 0'S X'Y PARTIAL AGGREGATION:

$$X'Y = \begin{matrix} 310 \\ 320 \\ 330 \\ 340 \end{matrix} + \begin{matrix} 1766 \\ 1792 \\ 1818 \\ 1844 \end{matrix} = \begin{matrix} 2076 \\ 2112 \\ 2148 \\ 2184 \end{matrix}$$

*Fig. 12*

1300 — LOOP: EXAMPLE NODE DATA PROCESSOR CALCULATION OF ITS PORTION OF W FROM X, Y, b, THEN X'WX AND X'WY FOR SUBSEQUENT ITERATIONS. W IS DIAGONAL AND ITS iTH DIAGONAL ELEMENT IS $w(ii) = f(x_i, y_i, b)$.

1302 — NODE 0 INPUTS:

$$X = \begin{matrix} x11 & x12 & x13 & x14 \\ x21 & x22 & x23 & x24 \end{matrix} = \begin{matrix} 11 & 12 & 13 & 14 \\ 21 & 22 & 23 & 24 \end{matrix}$$

$$Y = \begin{matrix} y^1 \\ y^2 \end{matrix} = \begin{matrix} 1 \\ 2 \end{matrix} \quad \text{AND} \quad b = (0.0, 0.0, 0.0)$$

ASSUME THE COMPUTED W ON NODE 0 AS:

$$W = \begin{matrix} w11 & w12 \\ w21 & w22 \end{matrix} = \begin{matrix} 0.1 & 0.0 \\ 0.0 & 0.2 \end{matrix}$$

THEREFORE, $X' = \begin{matrix} x11 & x21 \\ x12 & x22 \\ x13 & x23 \\ x14 & x24 \end{matrix} = \begin{matrix} 11 & 21 \\ 12 & 22 \\ 13 & 23 \\ 14 & 24 \end{matrix}$

1304 —

$$X'W = \begin{matrix} x11*w11 & x21*w22 \\ x12*w11 & x22*w22 \\ x13*w11 & x23*w22 \\ x14*w11 & x24*w22 \end{matrix} = \begin{matrix} 1.1 & 4.2 \\ 1.2 & 4.4 \\ 1.3 & 4.6 \\ 1.4 & 4.8 \end{matrix}$$

MATCH TO FIG.13B

Fig. 13A

MATCH TO FIG.13A

THEN, CALCULATING x'wx:

(x'wx)11 = x11*w11*x11+x21*w22*x21 = 1.1*11 + 4.2*21 = 100.3
(x'wx)12 = x11*w11*x12+x21*w22*x22 = 1.1*12 + 4.2*22 = 105.6
(x'wx)13 = x11*w11*x13+x21*w22*x23 = 1.1*13 + 4.2*23 = 110.9
(x'wx)14 = x11*w11*x14+x21*w22*x24 = 1.1*14 + 4.2*24 = 116.2
(x'wx)21 = x12*w11*x11+x22*w22*x21 = 1.2*11 + 4.4*21 = 105.6
(x'wx)22 = x12*w11*x12+x22*w22*x22 = 1.2*12 + 4.4*22 = 111.2
(x'wx)23 = x12*w11*x13+x22*w22*x23 = 1.2*13 + 4.4*23 = 116.8
(x'wx)24 = x12*w11*x14+x22*w22*x24 = 1.2*14 + 4.4*24 = 122.4
(x'wx)31 = x13*w11*x11+x23*w22*x21 = 1.3*11 + 4.6*21 = 110.9
(x'wx)32 = x13*w11*x12+x23*w22*x22 = 1.3*12 + 4.6*22 = 116.8
(x'wx)33 = x13*w11*x13+x23*w22*x23 = 1.3*13 + 4.6*23 = 122.7
(x'wx)34 = x13*w11*x14+x23*w22*x24 = 1.3*14 + 4.6*24 = 128.6
(x'wx)41 = x14*w11*x11+x24*w22*x21 = 1.4*11 + 4.8*21 = 116.2
(x'wx)42 = x14*w11*x12+x24*w22*x22 = 1.4*12 + 4.8*22 = 122.4
(x'wx)43 = x14*w11*x13+x24*w22*x23 = 1.4*13 + 4.8*23 = 128.6
(x'wx)44 = x14*w11*x14+x24*w22*x24 = 1.4*14 + 4.8*24 = 134.8

THUS x'wx = 100.3  105.6  110.9  116.2
            105.6  111.2  116.8  122.4
            110.9  116.8  122.7  128.6
            116.2  122.4  128.6  134.8

COMPUTER-IMPLEMENTED DISTRIBUTED ITERATIVELY REWEIGHTED LEAST SQUARES SYSTEM AND METHOD

FIELD

The technology described herein relates generally to distributed data processing and more specifically to statistical estimation using distributed data processing.

BACKGROUND

Statistical estimation often requires the optimization of an objective function to determine a possible value for a parameter to be estimated. For some objective functions, traditional methods such as the Newton-Raphson method may be used to perform such an optimization and estimation. However, for more complex problems, such methods are not able to perform the requested determinations. These more complex problems often become very difficult to solve, requiring sizeable amounts of time and computing resources. Simplification of these problems to reduce the time and resource requirements may often result in less than desirable quality of estimations.

SUMMARY

In accordance with the teachings provided herein, systems and methods are provided for a distributed data processor system having multiple data processors for performing an estimation using an iteratively reweighted least squares technique on a scenario defined by a design matrix (X), a response variable vector (Y), and a parameter to be estimated ($\beta$). As an example, a system and method may include a root data processor for performing a plurality of processing iterations, where a least squares estimate (b) is calculated by the root data processor during each processing iteration, the root data processor being configured to command further processing iterations until the least squares estimate (b) converges. The system and method may further include a plurality of node data processors for receiving the plurality of processing iteration commands from the root data processor. Upon receipt of a command to perform a processing iteration, a node data processor is also configured to: access one or more rows of the design matrix (X) and the response variable vector (Y) assigned to the node data processor, update values of a weight matrix (W) according to a current state of the least squares estimate (b) for processing iterations subsequent to a first processing iteration, determine a first intermediate value based on the assigned rows of the design matrix (X) and the weight matrix (W), determine a second intermediate value based on the assigned rows of the design matrix (X), the assigned rows of the response variable vector (Y), and the updated values of the weight matrix (W), and output the first intermediate value and the second intermediate value. The root data processor may be further configured to calculate an updated least squares estimate (b) based on a sum of the first intermediate values from the node data processors and a sum of the second intermediate values from the node data processors, the root data processor being configured to store the least squares estimate (b) on a computer-readable medium as the parameter to be estimated ($\beta$) upon convergence of the least squares estimate (b).

As another example, a system and method for performing an estimation via an iteratively reweighted least squares technique for a scenario defined by a design matrix, a response variable vector, and a parameter to be estimated utilizes a distributed data processor system having multiple data processors that include a root data processor and a plurality of node data processors. The system and method may include accessing one or more assigned rows of the design matrix and the response variable vector by each node data processor and initializing a weight matrix by each node data processor. The method may further include determining a first intermediate value based on the assigned rows of the design matrix and the weight matrix at each node data processor, and determining a second intermediate value based on the assigned rows of the design matrix, the assigned rows of the response vector, and the weight matrix at each node data processor. The node data processors may output the first intermediate value and the second intermediate value, and the root data processor may calculate an updated least squares estimate based on a sum of the first intermediate values from the node data processors and a sum of the second intermediate values from the node data processors. The method may also include instructing the node data processors to perform another iteration if the updated least squares estimate has not converged by updating the weight matrix at the node data processors according to the updated least squares estimate transmitted from the root data processor, calculating new first intermediate values and second intermediate values, and storing the least squares estimate on a computer-readable medium as the parameter to be estimated if the updated least squares estimate has converged.

BRIEF DESCRIPTION OF THE DRAWINGS

FIG. 7 depicts example data for a multi-processor iteratively reweighted least squares estimation.

FIG. 8 depicts the assignment of rows of the design matrix, X, and the response variable vector, Y, to each of four node data processors in a five processor configuration having one root data processor and four node data processors.

FIG. 10 depicts the $\log_2$ collection and summing of the first intermediate value, X'WX, determined at each of the four node data processors.

FIG. 11 depicts the calculation of a second intermediate value, X'WY during a first iteration at each of the four node data processors.

FIG. 12 depicts the $\log_2$ collection and summing of the second intermediate value, X'WY, determined at each of the four node data processors.

FIG. 13A-13B depict the determination of the first intermediate variable at a node data processor where the weight matrix, W, has been updated and is not an identity matrix.

DETAILED DESCRIPTION

Figure 1:
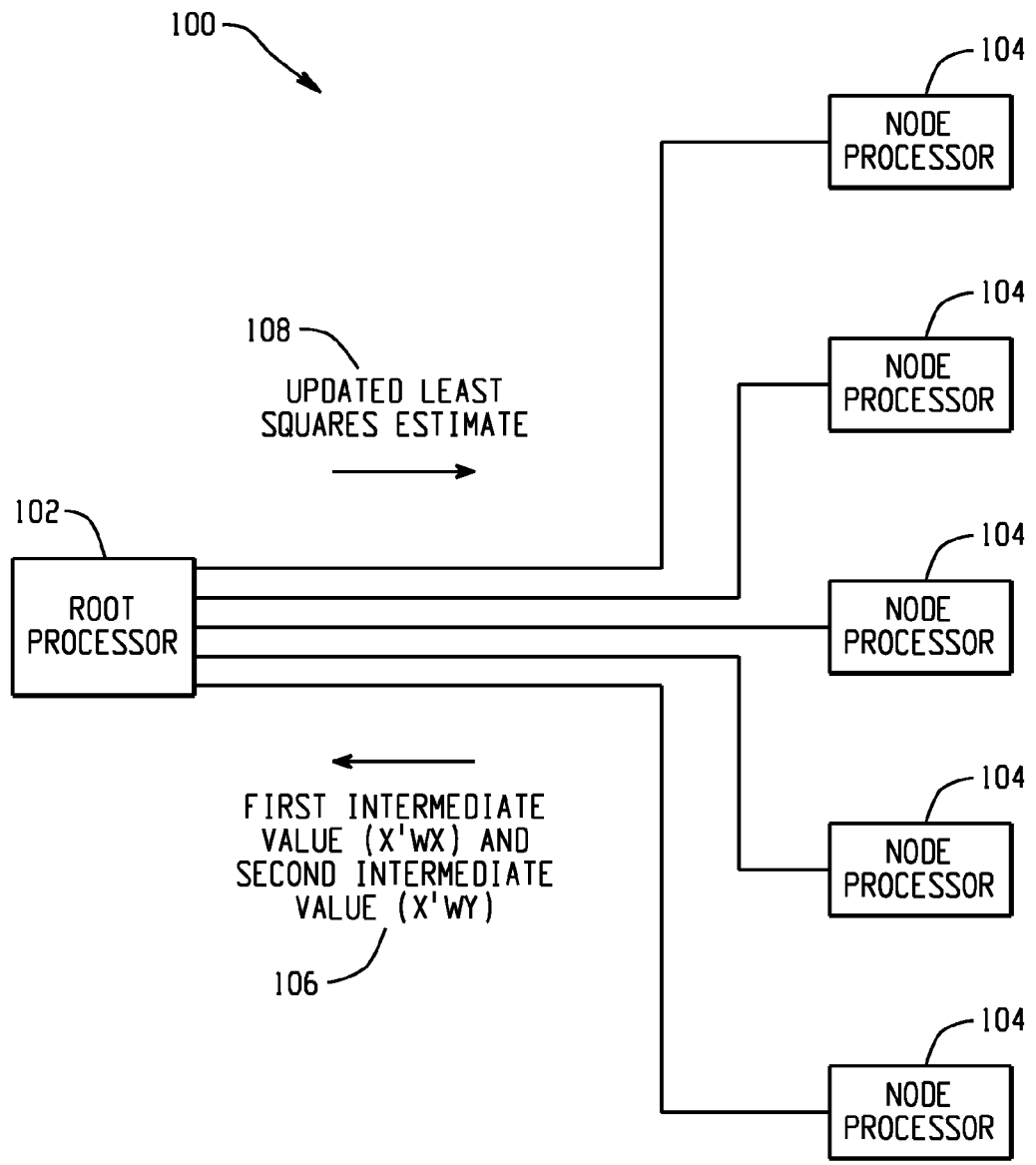
FIG. 1 depicts a distributed data processor system having multiple data processors for performing an estimation using an iteratively reweighted least squares technique on a scenario defined by a design matrix (X), a response variable vector (Y), and a parameter to be estimated ($\beta$).

FIG. 1 depicts at 100 a distributed data processor system having multiple data processors for performing an estimation using an iteratively reweighted least squares technique on a scenario defined by a design matrix (X), a response variable vector (Y), and a parameter to be estimated ($\beta$). The system 100 includes a root data processor 102 for performing a plurality of processing iterations, where the root data processor 102 calculates a least squares estimate (b) during each processing iteration. The root data processor 102 commands a plurality of node data processors 104 to assist in processing iterations until the least squares estimate converges.

Each of the plurality of node data processors 104 receives a processing iteration command from the root data processor 102. Following receipt of a processing iteration command, each node data processor 104 accesses one or more rows of the design matrix and the response vector assigned to the node data processor. For example, the root data processor may divide a ten row design matrix among five node data processors 104 such that each node data processor is assigned two rows of the design matrix. A node data processor 104 may access its one or more rows of the design matrix in a variety of ways such as receiving them directly or indirectly from the root data processor, receiving an address identifying from where the assigned rows may be accessed, accessing a memory location assigned for holding assigned rows for the particular node data processor, or other ways.

Each node data processor 104 then performs a portion of the calculations for determining an updated value for the least squares estimate by calculating one or more intermediate values as will be described in further detail below with respect to FIG. 3. For example, each node data processor 104 may calculate a first intermediate value, X'WX, where W represents a weight matrix, and a second intermediate value, X'WY, for the node data processor's assigned rows of the design matrix, X. These intermediate values are output, as shown at 106, and the root data processor calculates an updated least squares estimate based on the sums of the first and second intermediate values from the node data processors. For example, an updated least squares estimate may be determined using a calculation of the inverse of the first intermediate value times the second intermediate value, such that $b=(X'WX)^{-1}X'WY$.

If the least squares estimate, b, has converged, then the least squares estimate may be identified as the estimate of the parameter, $\beta$. If the least squares estimate has not converged, then the updated least squares estimate is provided to the node data processors 104, as shown at 108, to be used in updating the weight matrix (the weight matrix may be set as an identity matrix for an initial iteration), and another processing iteration may be commanded. Convergence may be determined in a variety of ways such as comparing a previous least squares estimate to an updated least squares estimate. If the difference between the previous least squares estimate and the updated least squares estimate is small (e.g., within 0.0001), then the least squares estimate may be deemed converged.

In an alternate configuration, the calculation of the updated least squares estimate and commanding of additional processing iterations may be performed at one of the node data processors 104 calculating the intermediate values, with a final estimate of the parameter, $\beta$, being provided to the root data processor upon detection of convergence.

Such a system may be implemented in a variety of contexts. For example, many statistical estimation problems may be reduced to an optimization problem in the form of $$\min_\beta \sum_{i=1}^{n} \rho(x_i, y_i, \beta),$$

where $\rho$ is the objective function; ($x_i$, $y_i$) is the observed ith covariate-response vector; and $\beta$ is the parameter to be estimated. When the function, $\rho$, has continuous second derivatives in $\beta$, the classical Newton-Raphson method may be used to solve the optimization. Often, however, the function, $\rho$, does not have second derivatives in $\beta$ (e.g., Tukey's Bisquare function used in robust regression). In such cases, other methods, such as the iteratively reweighted least squares (IRLS) method, may be used. The iteratively reweighted least squares method may also be useful where the optimization problem has several local minima in $\beta$, regardless of whether the function $\rho$ has continuous second derivatives in $\beta$.

With extensive possible applications, the iteratively reweighted least squares method may be used to solve certain very large problems. However, the iterative nature of the method may tend to be computationally expensive, oftentimes so expensive as to be unfeasible to implement. Multiple machines connected via a network may be configured to offer an economic mechanism for performing such extensive computing. Such a system that maps the iteratively reweighted least squares method on a network-connected distributed system may be used for solving various estimation problems on a distributed system that include maximum likelihood estimation for generalized linear models and accelerated failure models with censored data, quasi-likelihood estimation with generalized estimating equations, and robust regression.

Figure 2:
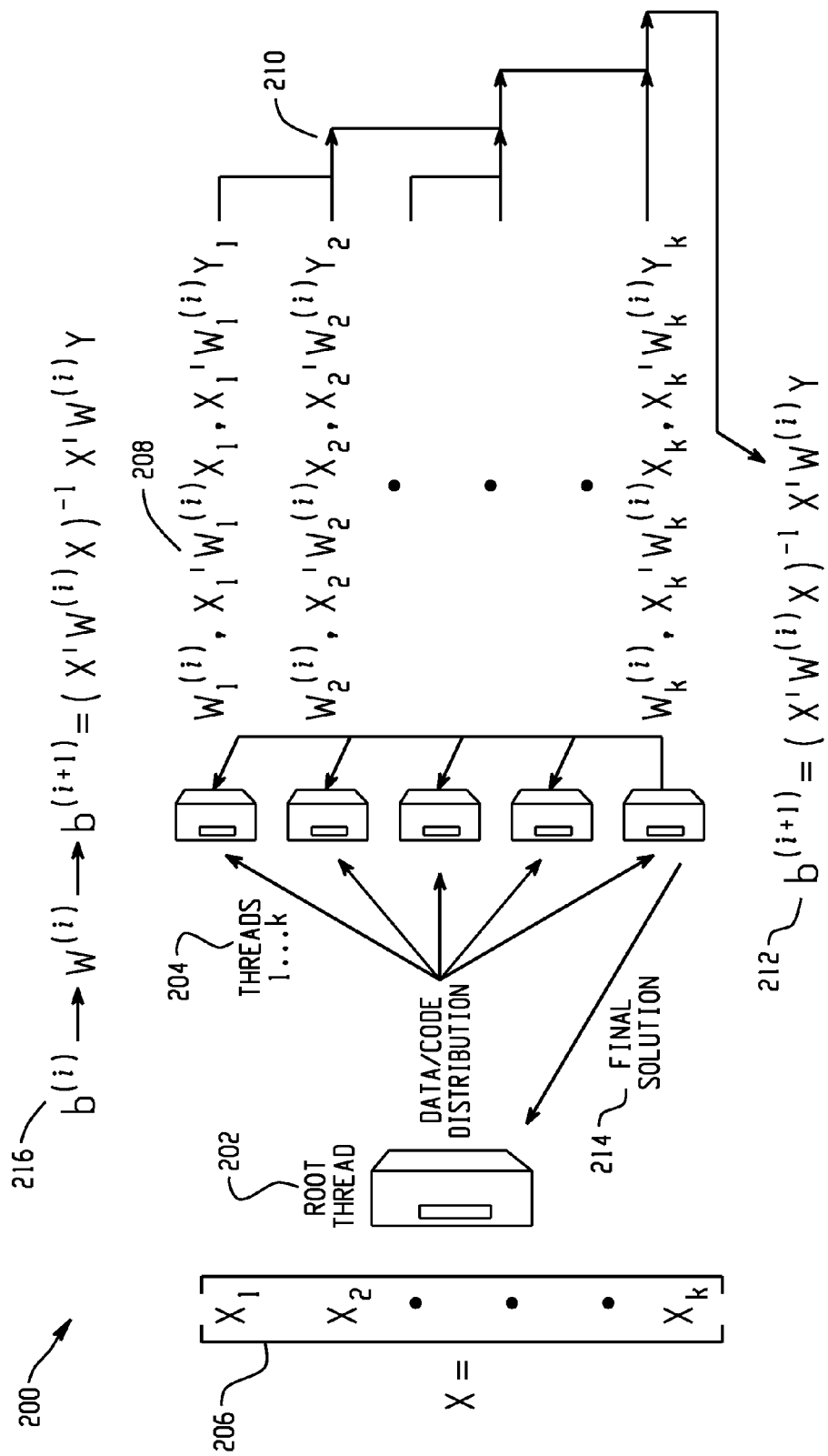
FIG. 2 depicts a distributed multi-threaded data processor system having multiple data processors for performing an estimation using an iteratively reweighted least squares technique on a scenario defined by a design matrix, a response variable vector, and a parameter to be estimated.

FIG. 2 depicts at 200 a distributed multi-threaded data processor system having multiple data processors for performing an estimation using an iteratively reweighted least squares technique on a scenario defined by a design matrix, a response variable vector, and a parameter to be estimated. The multi-threaded data processor system 200 includes a root thread 202 as well as a plurality of node threads 204. In the multi-threaded data processor system 200, each data processor contained on one or more computer or servers may calculate intermediate values for one or more portions of the design matrix in individual threads. Thus, all the computing may be performed by many threads on a single machine or by single threads, each on a different machine, or variations in between. The plurality of node threads 204 and the root thread 202 communicate amongst each other using a communications interface such as the message passing interface (MPI) or other interface.

The root thread 202 begins processing by distributing data that may include portions of the design matrix, X, shown at 206, to the node threads 204. The design matrix may be formed by vectors $X_i$, i=1 to n. The root thread 202 may also make all or a portion of the response variable vector, Y, available to the node threads 204. Each node thread 204 updates its weight matrix, W, and calculates its first and second intermediate values, as shown at 208. These intermediate values are summed, as shown at 210. These sums are utilized in calculating the updated least squares estimate, as shown at 212. If the root data processor or a node data processor determines that the least squares estimate has converged, then the least squares estimate may be identified as the estimate of the parameter, β, with the final estimate being provided to the root thread 202, as shown at 214. If the least squares estimate has not converged, then the updated least squares estimate is provided to the node data processors 204 to be used in updating the weight matrix, and another processing iteration may be commanded. Thus, a least squares estimate is used by the node threads to update a weight matrix, which is used to calculate an updated least squares estimate using the first and second intermediate values, as shown at 216.

Figure 3:
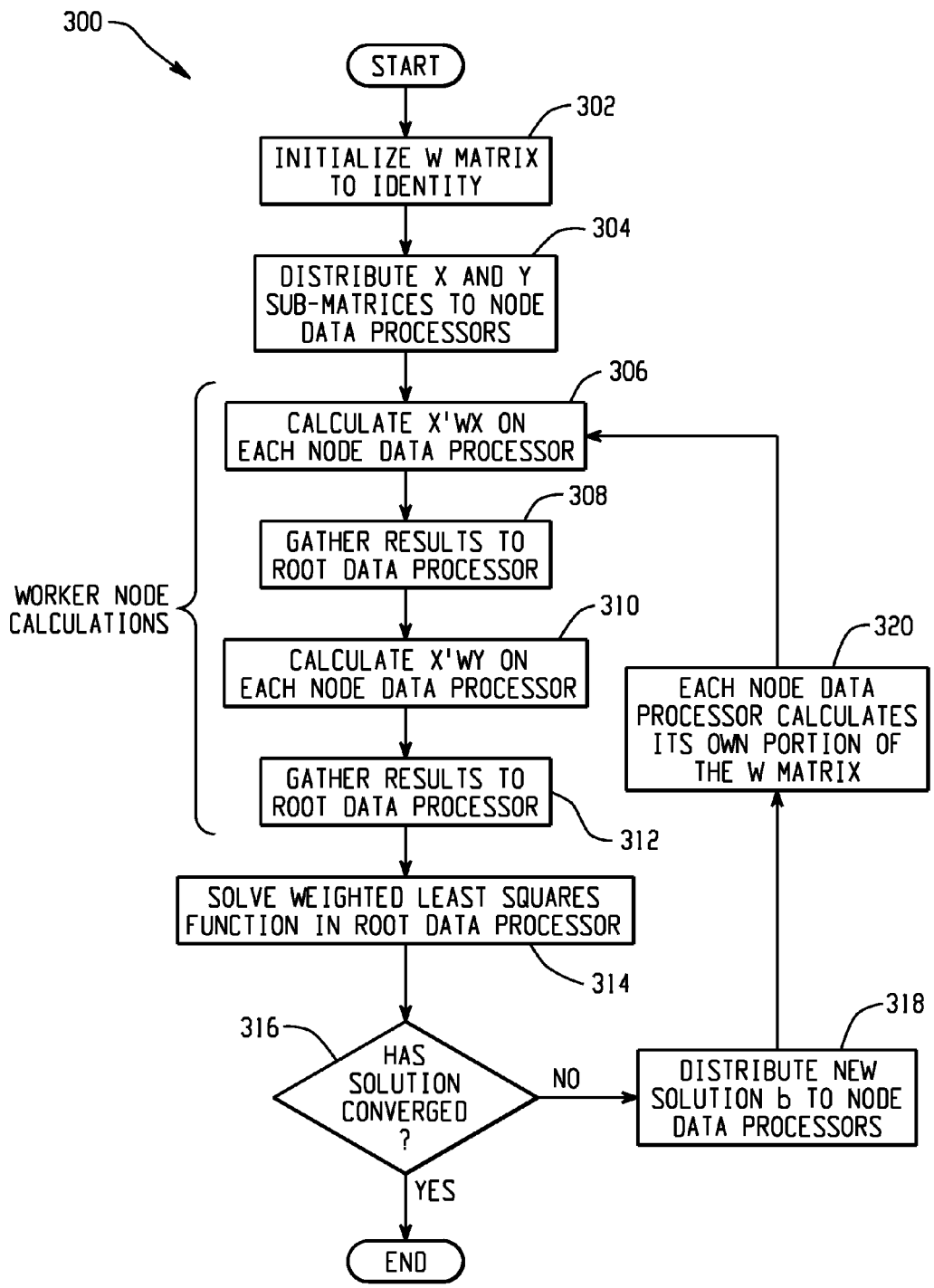
FIG. 3 is a flow diagram depicting at 300 a method for performing an estimation via an iteratively reweighted least squares technique for a scenario defined by a design matrix, a response variable vector, and a parameter to be estimated using a distributed data processing system having multiple data processors that include a root data processor and a plurality of node data processors.

FIG. 3 is a flow diagram depicting at 300 a method for performing an estimation via an iteratively reweighted least squares technique for a scenario defined by a design matrix, a response variable vector, and a parameter to be estimated using a distributed data processing system having multiple data processors that include a root data processor and a plurality of node data processors. At 302, the weight matrix is initialized at each node data processor as an identity matrix. Submatrices of the design matrix (X) and the response variable vector (Y) are distributed to the node data processors at 304. Each node data processor calculates X'WX as a first intermediate value, as shown at 306, and the first intermediate values are gathered to a root node and summed at 308. Each node data processor further calculates X'WY as a second intermediate value, as shown at 310, and the second intermediate values are gathered to a root node and summed at 312. At 314, the weighted least squares function is solved to generate an updated least squares estimate. A determination is made at 316 as to whether the solution has converged. If the solution has converged, then the least squares estimate is output or stored in a computer-readable medium as the estimated parameter. If the solution has not converged, then the updated least squares estimate, b, is distributed to the node data processors at 318, and each node data processor calculates its weight matrix as an updated weight matrix based on the updated least squares estimate, as shown at 320, and the loop 306, 308, 310, 312, 314, 316 is repeated in an additional processing iteration.

Figure 4:
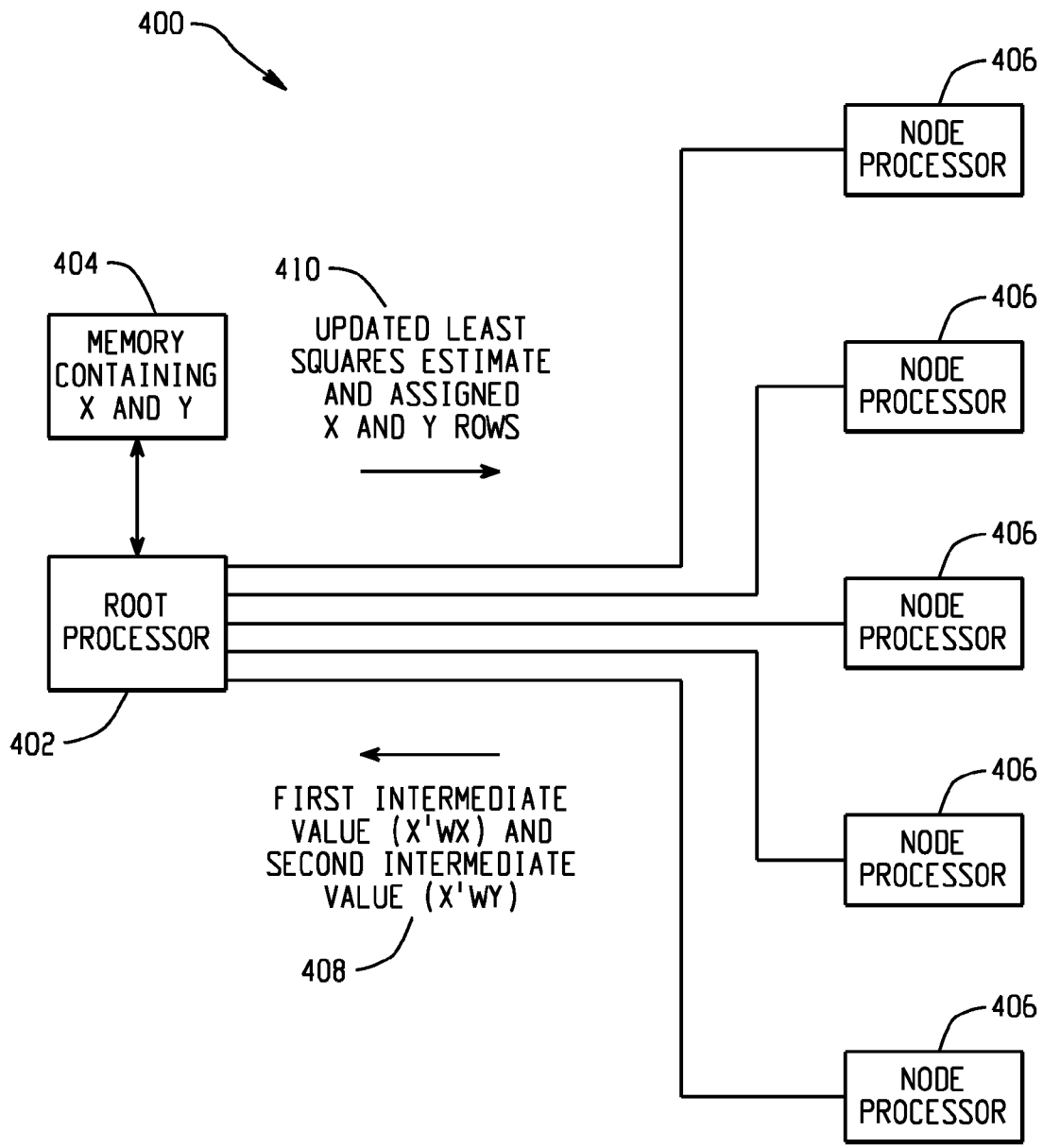
FIG. 4 is a block diagram depicting a configuration for node data processors to access one or more rows of the design matrix and response variable vector assigned to the node data processors.

FIG. 4 is a block diagram depicting at 400 a configuration for node data processors to access one or more rows of the design matrix and response variable vector assigned to the node data processors. In the configuration of FIG. 4, the root data processor 402 accesses the design matrix and response variable vector rows from a memory 404 and provides the rows to their respective node data processors 406. Processing may then proceed, where intermediate values are calculated and transferred, as shown at 408, and updated least squares estimates are provided to the node data processors, as shown at 410, until the least squares estimate converges.

Figure 5:
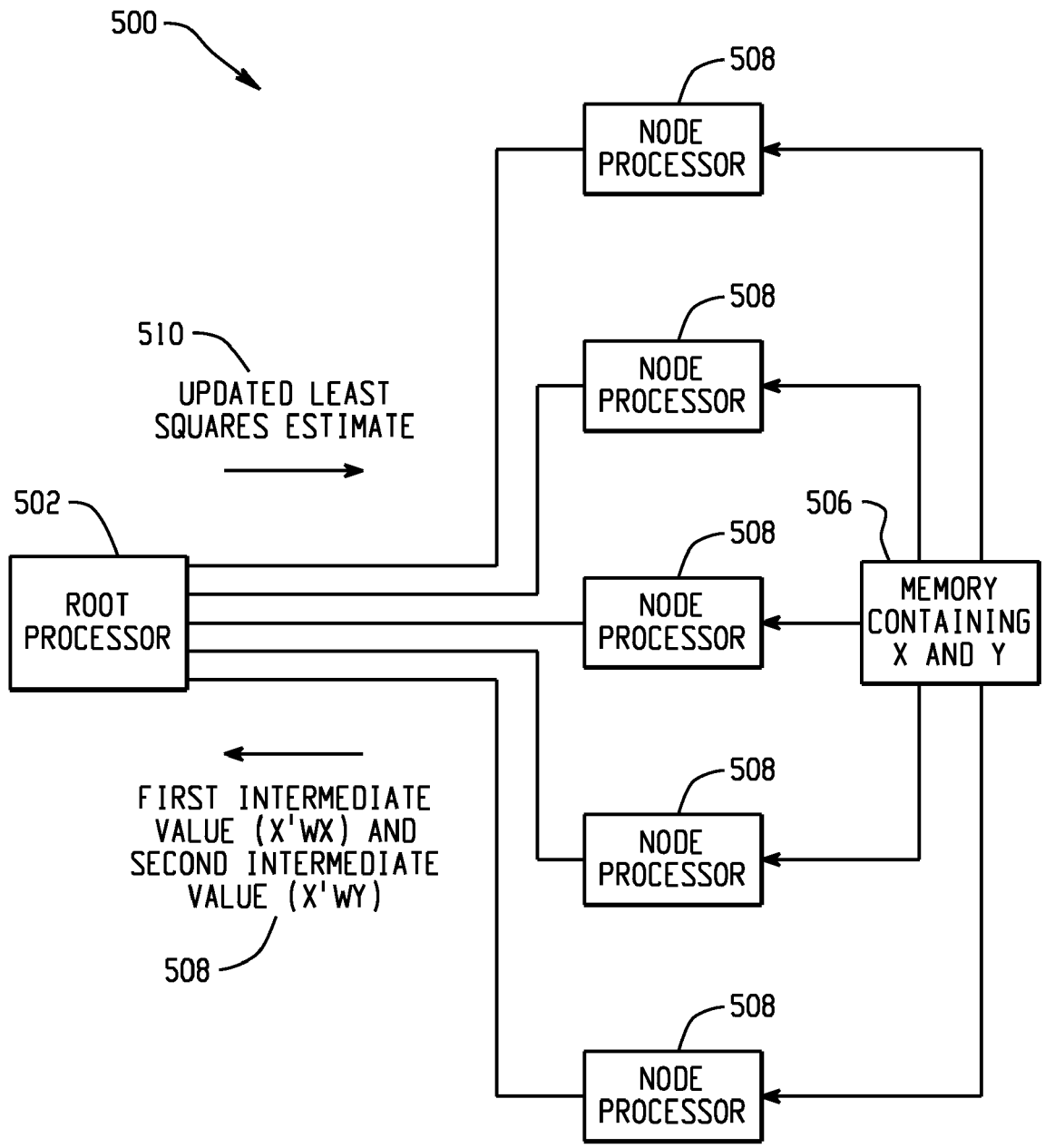
FIG. 5 is a block diagram depicting a second configuration for node data processors to access one or more rows of the design matrix and response variable vector assigned to the node data processors.

FIG. 5 is a block diagram depicting at 500 a second configuration for node data processors to access one or more rows of the design matrix and response variable vector assigned to the node data processors. In the configuration of FIG. 5, the root data processor 502 issues a command to commence processing, and the node data processors 504 access their assigned design matrix and response variable vector rows from a memory 506. Addresses in the memory 506 containing a node data processor's assigned rows may be communicated to the node data processors 504 by the root data processor 502. Alternatively, the memory locations containing a node data processor's rows may be previously known to the node data processors 504. For example, a node data processor 504 may always access its rows from the same known address in the memory 506. Processing may then proceed as described herein above, where intermediate values are calculated and transferred, as shown at 508, and updated least squares estimates are provided to the node data processors, as shown at 510, until the least squares estimate converges.

Figure 6:
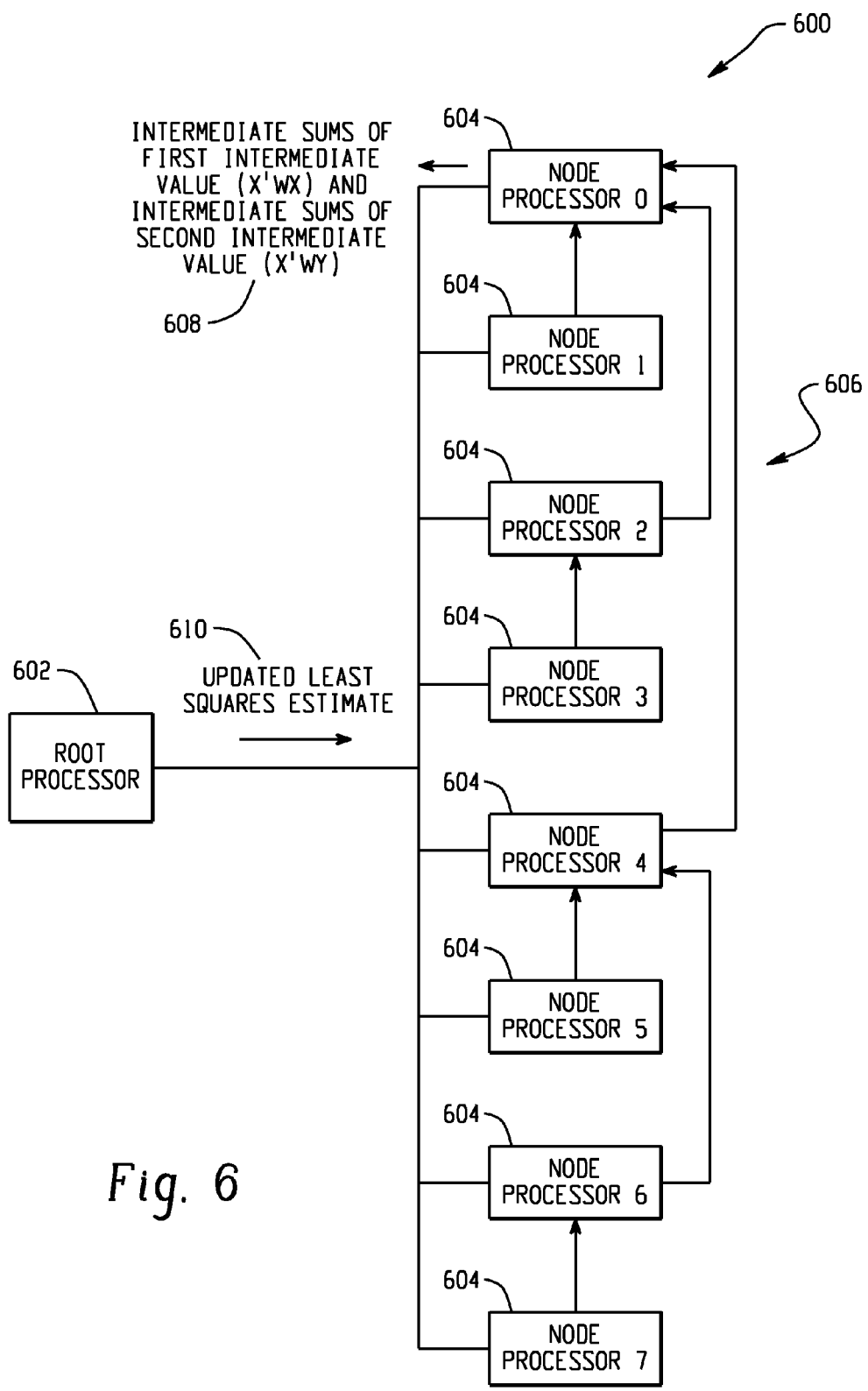
FIG. 6 is a block diagram depicting a configuration for collecting and summing intermediate values.

FIG. 6 is a block diagram depicting at 600 a configuration for collecting and summing intermediate values. A root data processor 602 issues a command to commence processing, and the node data processors 604 calculate their individual first and second intermediate values. These first and second intermediate values may be collected and summed in a $\log_2$ accumulation, as depicted at 606, such that the first intermediate value and the second intermediate value are summed at a subset of the plurality of node data processors 604 so that the root data processor 602 does not receive the first intermediate value and the second intermediate value from each node data processor 604. For example, in a first step, node data processors 1, 3, 5, and 7 may output their first and second intermediate values to nodes 0, 2, 4, and 6, respectively, where the intermediate values are summed with the intermediate values stored at nodes 0, 2, 4, and 6. The intermediate values stored at nodes 2 and 6 are then outputted to nodes 0 and 4, respectively, where the intermediate values are summed with the intermediate values stored at nodes 0 and 4. The intermediate values stored at node data processor 4 are then outputted to node data processor 0 where the intermediate values are summed with the intermediate values stored at node 0. The summed intermediate values may then be passed to the root data processor 602 as shown at 608, where an updated least squares estimate may be calculated and provided to the node data processors 604, as shown at 610, should the least squares estimate not converge. Alternatively, the updated least squares estimate, convergence testing, and updated least squares estimate distribution may be facilitated by one of the calculating node data processors 604, such as node data processor 0, with a final least squares estimate being provided to the root data processor 602 upon convergence.

FIG. 7 depicts example data for a multi-processor iteratively reweighted least squares estimation. An 8×4 design matrix, X, having entries labeled x11 to x84, is populated with the values shown at 702. A 1×8 response variable matrix, Y, having entries labeled y1 to y8, is populated with the values shown at 704. A 4×4 weight matrix, having entries labeled w11 to w44, is initialized as an identity matrix, as shown at 706.

FIG. 8 depicts the assignment of rows of the design matrix, X, to each of four node data processors in a five processor configuration having one root data processor and four node data processors. Each of the four node data processors, node 0, node 1, node 2, and node 3 accesses two rows of the eight row design matrix and response variable vector for processing.

Figure 9A:
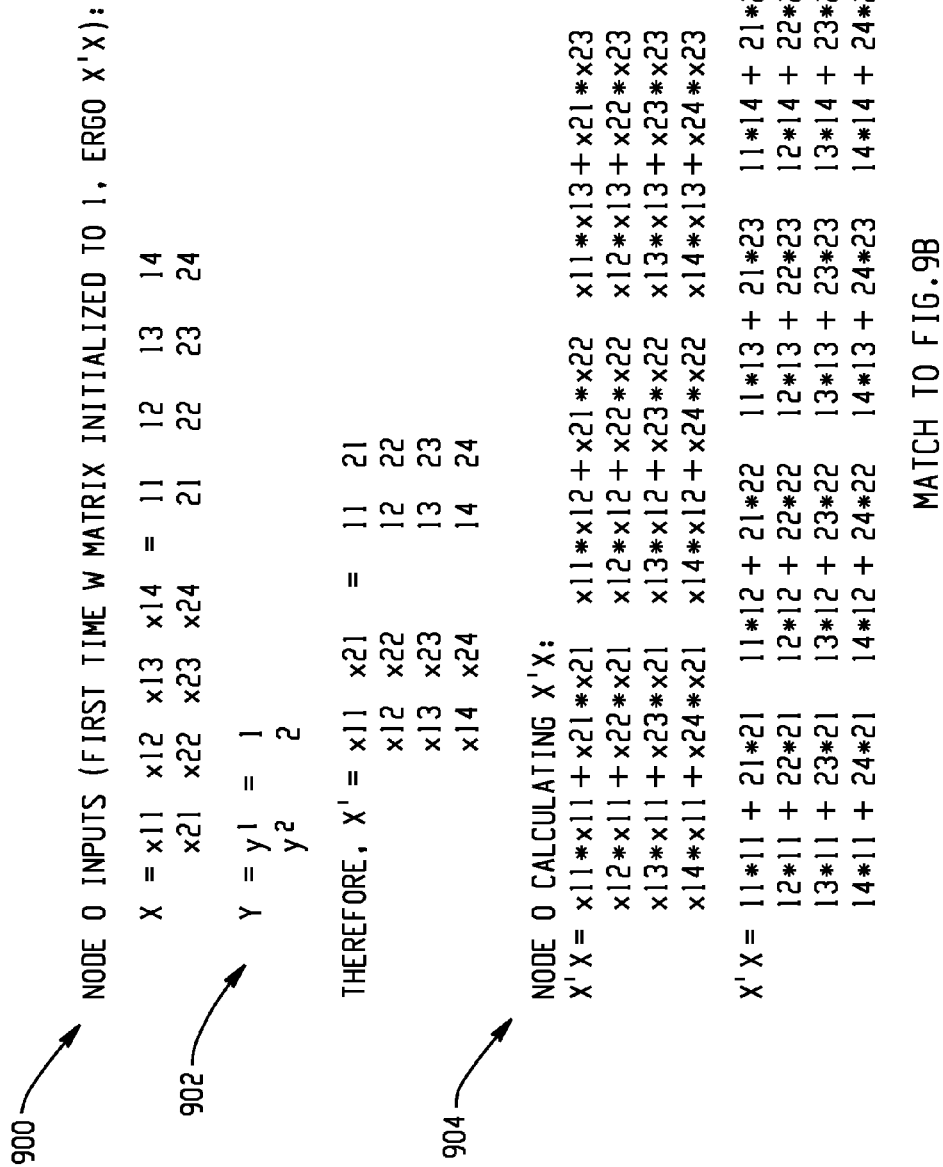
FIGS. 9A and 9B depict the calculation of a first intermediate value, X'WX, during a first iteration at each of the four node data processors.
Figure 9B:

FIGS. 9A and 9B depict the calculation of a first intermediate value, X'WX, during a first iteration at each of the four node data processors. Because the weight matrix, W, is initialized as the identity matrix, for the first iteration, the calculation of X'WX is accomplished by calculating X'X. FIG. 9A depicts the determination of X' at 902 and a detailed depiction of the calculation of X'X at node data processor 0 at 904. FIG. 9B depicts results of the X'X calculations at the other nodes at 906.

FIG. 10 depicts the $\log_2$ collection and summing of the first intermediate value, X'WX, determined at each of the four node data processors. In a first stage, the X'WX (X'X when the weight matrix W is an identity matrix) intermediate value from node 1 is collected and summed at node 0 with the node 0 intermediate value, as shown at 1002. Similarly, and possibly simultaneously, the X'WX intermediate value from node 3 is collected and summed at node 2 with the node 2 intermediate value, as shown at 1004. In a second stage, the X'WX intermediate value from node 2 is collected and summed at node 0 with the node 0 intermediate value, as shown at 1006. The summed X'WX first intermediate value may then be converted to a lower triangular form, as shown at 1008.

FIG. 11 depicts the calculation of a second intermediate value, X'WY during a first iteration at each of the four node data processors. After accessing its rows of the X and Y matrices and determining X', as shown at 1102, node data processor 0 calculates X'Y (with W being an identity matrix), as shown at 1104. Similarly, X'Y is calculated at node data processors 1, 2, and 3, as shown at 1106.

FIG. 12 depicts the $\log_2$ collection and summing of the second intermediate value, X'WY, determined at each of the four node data processors. In a first stage, the X'WY (X'Y when the weight matrix W is an identity matrix) intermediate value from node 1 is collected and summed at node 0 with the node 0 intermediate value, as shown at 1202. Similarly, and possibly simultaneously, the X'WY intermediate value from node 3 is collected and summed at node 2 with the node 2 intermediate value, as shown at 1204. In a second stage, the X'WY intermediate value from node 2 is collected and summed at node 0 with the node 0 intermediate value, as shown at 1206.

The root data processor or one of the node data processors then calculates an updated least squares estimate based on the collected and summed first and second intermediate values. If the least squares estimate has converged, then the updated least squares estimate is output as the parameter estimate. If the least squares estimate has not converged, then the updated least squares estimate is output to the node data processors for updating of the node data processors' weight matrices and determination of new sets of first and second intermediate values. Each node data processor calculates its weight matrix, W, by computing a diagonal W matrix with the ith diagonal elements computed as $W(ii)=f(x_i, y_i, b)$, where b is the updated least squares estimate received by the node data processor and $f$ is the weight function which is decided based on the type of least square technique being utilized (e.g., the weight function for Tukey's Bisquare estimator is $$f_B(x, y, b) = \begin{cases} 3[1 - (r/B)^2]^2, & |r| <= B \\ 0, & |r| > B, \end{cases}$$

where r=y−x'b is the residual and B is a constant).

FIG. 13A and 13B depict the determination of the first intermediate variable X'WX at node data processor 0 where the weight matrix, W, has been updated and is not an identity matrix. The inputs to the subsequent node data processor calculation are shown at 1302, where the weight matrix, W, is not an identity matrix. In the examples of FIGS. 13A and 13B, X'W is calculated at 1304, and then X'WX is determined at 1306.

A distributed iteratively reweighted least squares implementation may reduce the computing time for W, X'WX, and X'WY from an $O_{compute}(np^3)$ to an $O_{compute}(np^3/k)$ with the addition of communication latencies among processors. The $\log_2$ aggregation limits these communication times in the $\log_2$ scale of the number of nodes, k, which is $O_{communicate}(p^2 \log_2 k)$. The $\log_2$ aggregation method enables the implementation to utilize a larger number of optimum nodes for a large problem compared to other aggregation methods.

While the examples described herein utilize a diagonal weight matrix, which is commonly seen in robust regression and maximum likelihood estimation with independent observations, the implementation may also be utilized with problems with block-diagonal weight matrices common with longitudinal data. The implementation may further be utilized in problems with a full weight matrix by transferring such problems to problems with a diagonal weight matrix.

Figure 14A:
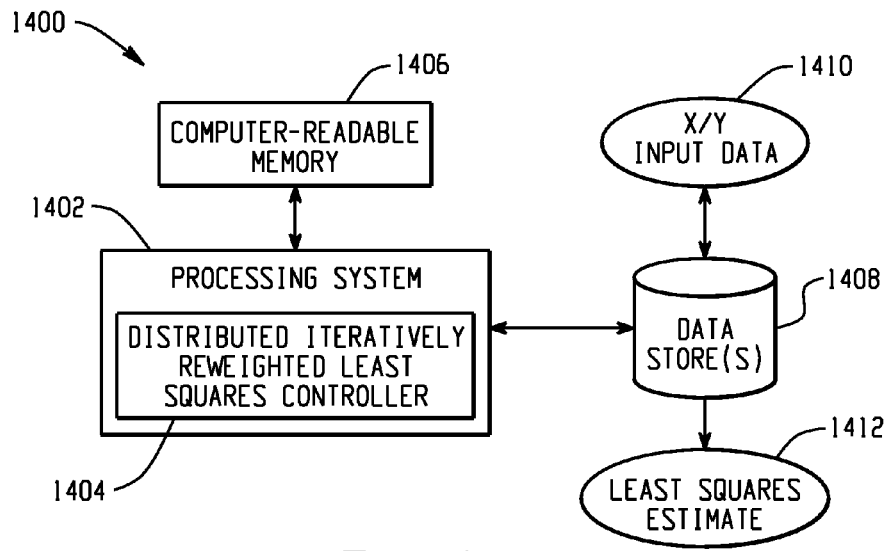
FIGS. 14A, 14B, and 14C depict example processing systems for use in implementing a mathematical function transfer manager.
Figure 14B:
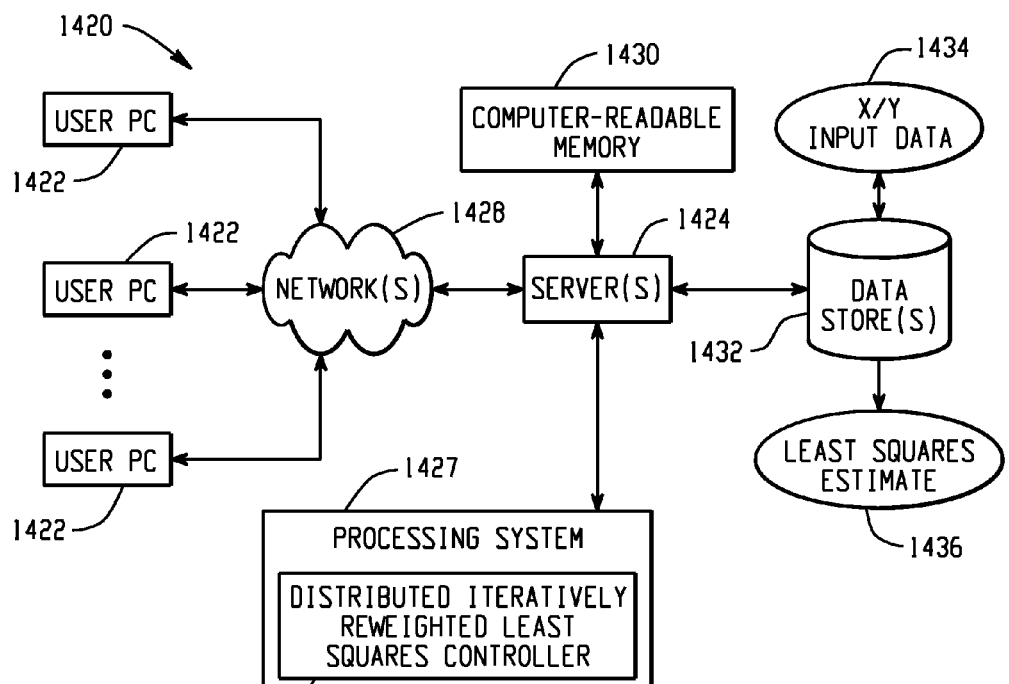
Figure 14C:
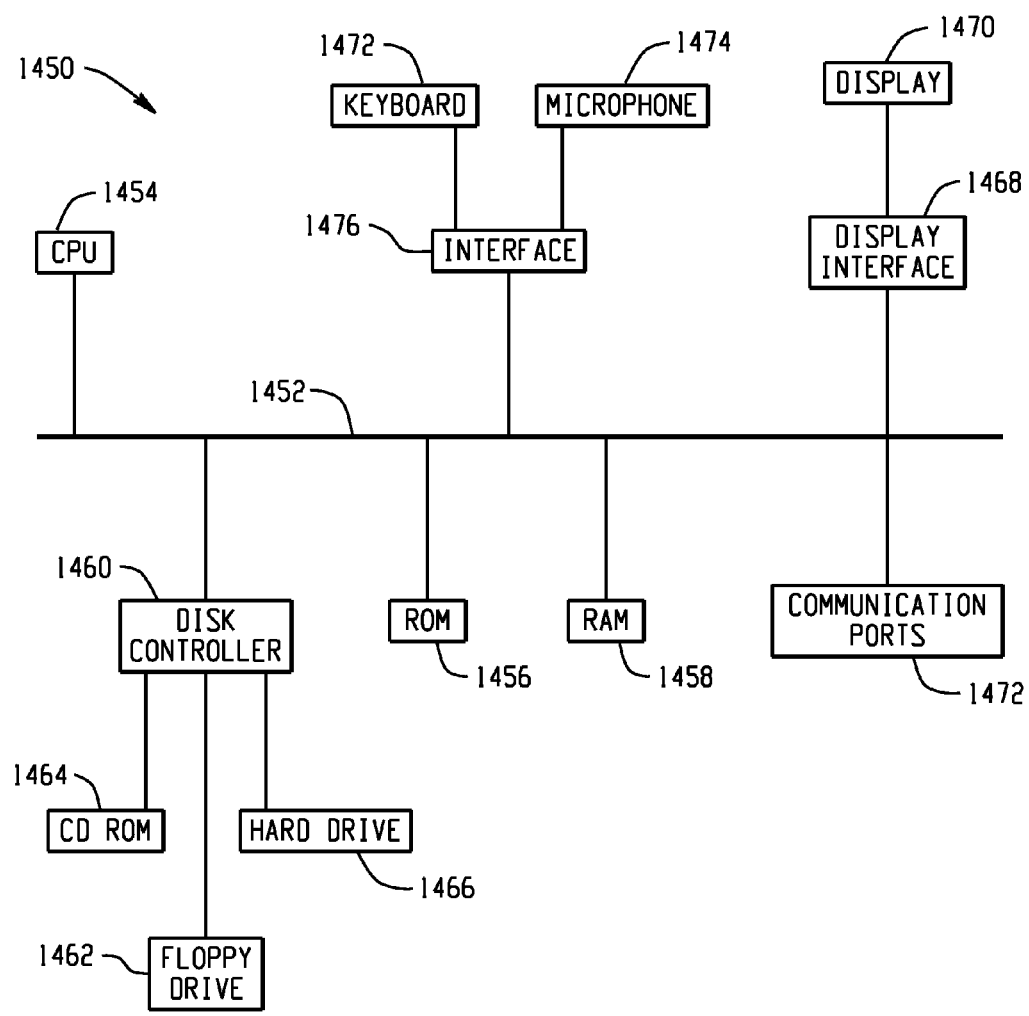

FIGS. 14A, 14B, and 14C depict example systems for use in implementing a distributed iteratively reweighted least squares controller that directs a root processor to manage an estimation. For example, FIG. 14A depicts an exemplary system 1400 that includes a stand alone computer architecture where a processing system 1402 (e.g., one or more computer processors) includes a distributed iteratively reweighted least squares controller 1404 being executed on it. The processing system 1402 has access to a computer-readable memory 1406 in addition to one or more data stores 1408. The one or more data stores 1408 may contain X/Y input data 1410 and/or least squares estimates 1412.

FIG. 14B depicts a system 1420 that includes a client server architecture. One or more user PCs 1422 accesses one or more servers 1424 running a distributed iteratively reweighted least squares controller 1426 on a processing system 1427 via one or more networks 1428. The one or more servers 1424 may access a computer readable memory 1430 as well as one or more data stores 1432. The one or more data stores 1432 may contain X/Y input data 1434 and/or least squares estimates 1436.

FIG. 14C shows a block diagram of exemplary hardware for a system 1450 that may be used to contain and/or implement the program instructions of system embodiments of the present invention. A bus 1452 may serve as the information highway interconnecting the other illustrated components of the hardware. A processing system 1454 labeled CPU (central processing unit) (e.g., one or more computer processors), may perform calculations and logic operations required to execute a program. A processor-readable storage medium, such as read only memory (ROM) 1456 and random access memory (RAM) 1458, may be in communication with the processing system 1454 and may contain one or more programming instructions for performing the method of implementing a distributed iteratively reweighted least squares controller. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1460 interfaces one or more optional disk drives to the system bus 1452. These disk drives may be external or internal floppy disk drives such as 1462, external or internal CD-ROM, CD-R, CD-RW or DVD drives such as 1464, or external or internal hard drives 1466. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1460, the ROM 1456 and/or the RAM 1458. Preferably, the processor 1454 may access each component as required.

A display interface 1468 may permit information from the bus 1456 to be displayed on a display 1470 in audio, graphic, or alphanumeric format. Communication with external devices may optionally occur using various communication ports 1472.

In addition to the standard computer-type components, the hardware may also include data input devices, such as a keyboard 1472, or other input device 1474, such as a microphone, remote control, pointer, mouse and/or joystick.

This written description uses examples to disclose the invention, including the best mode, and also to enable a person skilled in the art to make and use the invention. The patentable scope of the invention may include other examples. For example, the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A distributed data processor system having multiple data processors for generating an updated least squares estimate (b) for a parameter to be estimated (β) using an iteratively reweighted least squares technique on a scenario defined by a design matrix (X), a response variable vector (Y), and the parameter to be estimated (β), the system comprising:
   a root data processor for performing a plurality of processing iterations, wherein the updated least squares estimate (b) is calculated by the root data processor during each processing iteration;
   the root data processor being configured to command further processing iterations by node data processors until the updated least squares estimate (b) converges; and
   the node data processors for receiving the plurality of processing iteration commands from the root data processor, upon receipt of a command to perform a processing iteration, each node data processor being further configured to:
      receive one or more rows of the design matrix (X) assigned to the each node data processor and one or more rows of the response variable vector (Y) assigned to the each node data processor;
      update values of a weight matrix (W) for rows according to a current state of the updated least squares estimate (b) for processing iterations subsequent to a first processing iteration;
      determine a first intermediate value based on the assigned rows of the design matrix (X) and the weight matrix (W);
      determine a second intermediate value based on the assigned rows of the design matrix (X), the assigned rows of the response variable vector (Y), and the updated values of the weight matrix (W);
      output the first intermediate value and the second intermediate value to the root data processor;
   the root data processor being configured to receive the first intermediate values and the second intermediate values from the node data processors and to calculate the updated least squares estimate (b) based on a sum of the first intermediate values from the node data processors and a sum of the second intermediate values from the node data processors;
   the root data processor being configured to store the updated least squares estimate (b) on a non-transitory computer-readable medium as the parameter to be estimated (β) upon convergence of the updated least squares estimate (b).

2. The system of claim 1, wherein the plurality of node data processors initialize values of the weight matrix (W) for rows corresponding to the assigned rows for the first iteration as corresponding rows of an identity matrix.

3. The system of claim 1, wherein the first intermediate value is determined via a calculation of a product of X'WX for the assigned rows, wherein X is the design matrix, X' is the inverse of the design matrix, and W is the weight matrix.

4. The system of claim 1, wherein the second intermediate value is determined via a calculation of a product of X'WY for the assigned rows, wherein X' is the inverse of the design matrix, W is the weight matrix, and Y is the response variable vector.

5. The system of claim 1, wherein the root data processor calculates the updated least squares estimate (b) as the product of the inverse of the sum of the first intermediate value from the node data processors times the sum of the second intermediate value from the node data processors such that b=(X'WX)$^{-1}$X'WY, wherein X is the design matrix, X' is the inverse of the design matrix, W is the weight matrix, and Y is the response variable vector.

6. The system of claim 1, wherein the node data processors transmit their first intermediate value and second intermediate value in a log$_2$ accumulation, where the first intermediate value and the second intermediate value are summed at a subset of the plurality of node data processors, such that the root data processor does not receive the first intermediate value and the second intermediate value from each node data processor.

7. The system of claim 1, wherein each node data processor computes updates of the assigned rows of the weight matrix (W) without transmitting the assigned rows of the weight matrix (W) to any other node data processor or the root data processor.

8. The system of claim 1, wherein the weight matrix (W) is updated according to the relationship W(ii)=ƒ(x$_i$, y$_i$, b), where b is the least squares estimate calculated in a previous processing iteration.

9. The system of claim 1, wherein the root data processor transmits the assigned rows of the design matrix (X) and the response variable vector (Y) to each node data processor.

10. The system of claim 1, wherein each node data processor accesses assigned rows of the design matrix (X) and the response variable vector (Y) from a single computer-readable memory.

11. The system of claim 1, wherein the estimation is an optimization problem, $$\min_\beta \sum_{i=1}^n \rho(x_i, y_i, \beta),$$

where ρ is the object function, (x$_i$, y$_i$) is the covariate-response vector, and β is the parameter to be estimated.

12. The system of claim 11, wherein the object function, ρ, does not have continuous second derivatives in β.

13. The system of claim 11, wherein the object function, ρ, has more than one local minima in β.

14. The system of claim 1, wherein the root data processor and the node data processors are in different computers.

15. A method for generating an updated least squares estimate for a parameter to be estimated via an iteratively reweighted least squares technique for a scenario defined by a design matrix, a response variable vector, and the parameter to be estimated using a distributed data processor system having multiple data processors that include a root data processor and a plurality of node data processors, the method comprising:
receiving one or more assigned rows of the design matrix and one or more assigned rows of the response variable vector by each node data processor;
initializing, by each node data processor, a weight matrix to an identity matrix;
determining a first intermediate value based on the assigned rows of the design matrix and the weight matrix at each node data processor;
determining a second intermediate value based on the assigned rows of the design matrix, the assigned rows of the response variable vector, and the weight matrix at each node data processor;
outputting the first intermediate value and the second intermediate value from each node data processor to the root data processor;
calculating the updated least squares estimate based on a sum of the first intermediate values from the node data processors and a sum of the second intermediate values from the node data processors at the root data processor;
determining, using the root data processor, whether the updated least squares estimate has converged;
instructing the node data processors, based on a command from the root data processor, to perform another iteration if the root data processor determines that the updated least squares estimate has not converged by updating the weight matrix at the node data processors according to the updated least squares estimate transmitted from the root data processor and calculating new first intermediate values and second intermediate values; and
storing the updated least squares estimate on a non-transitory computer-readable medium as the parameter to be estimated if the root data processor determines that the updated least squares estimate has converged.

16. The method of claim 15, wherein the first intermediate value is determined via a calculation of a product of X'WX for the assigned rows, wherein X is the design matrix, X' is the inverse of the design matrix, and W is the weight matrix.

17. The method of claim 15, wherein the second intermediate value is determined via a calculation of a product of X'WY for the assigned rows, wherein X' is the inverse of the design matrix, W is the weight matrix, and Y is the response variable vector.

18. The method of claim 15, wherein the root data processor calculates the updated least squares estimate (b) as the product of the inverse of the sum of the first intermediate value from the node data processors times the sum of the second intermediate value from the node data processors such that b=(X'WX)$^{-1}$X'WY, wherein X is the design matrix, X' is the inverse of the design matrix, W is the weight matrix, and Y is the response variable vector.

19. The method of claim 15, wherein the estimation is an optimization problem, $$\min_\beta \sum_{i=1}^n \rho(x_i, y_i, \beta),$$

where ρ is the object function, (x$_i$, y$_i$) is the covariate-response variable vector, and β is the parameter to be estimated.

20. A method for determining an updated least squares estimate, comprising:
receiving, by each of a plurality of node data processors, one or more assigned rows of a design matrix and one or more assigned rows of a response variable vector;
initializing, by each node data processor, a weight matrix to an identity matrix;
determining, by each node data processor, a first intermediate value based on the assigned rows of the design matrix and the weight matrix;
determining, by each node data processor, a second intermediate value based on the assigned rows of the design matrix, the weight matrix, and the assigned rows of the response variable vector;
transmitting the first intermediate value and the second intermediate value from each node data processor to a root data processor;
calculating, by the root data processor, a sum of the first intermediate values from the node data processors;
calculating, by the root data processor, a sum of the second intermediate values from the node data processors;

calculating, by the root data processor, an updated least squares estimate based on the sum of the first intermediate values and the sum of the second intermediate values;

determining, by the root data processor, whether the updated least squares estimate has converged, wherein the updated least squares estimate is stored on a non-transitory computer-readable memory when the updated least squares estimate has converged; and instructing, by the root data processor, the node data processors to perform additional processing when the root data processor determines that the updated least squares estimate has not converged, wherein instructing includes the root data processor transmitting the updated least squares estimate to the node data processors, and wherein each node data processor updates the weight matrix at that node data processor using the updated least squares estimate.

\* \* \* \* \*